March 15, 1966 J. ROSLYN, JR 3,241,000

COMPUTER PATCHING MODULES

Filed Nov. 6, 1962

INVENTOR
JOSEPH ROSLYN JR.

BY E. A. Petter

ATTORNEY 3,241,000

COMPUTER PATCHING MODULES

Joseph Roslyn, Jr., Red Bank, N.J., assignor to Electronic Associates, Inc., Long Branch, N.J., a corporation of New Jersey Filed Nov. 6, 1962, Ser. No. 235,891
5 Claims. (Cl. 317—101)

This invention relates to computers and more particularly to improved interconnection and mounting apparatus therefor.

Electronic computers generally consist of a plurality of interconnected computing components or devices such as amplifiers, integrators, delay lines, attenuators and the like. These devices are usually mounted in separate chassis which may be in the form of "modules" whose thickness is normally based on integer multiples of a basic thickness. Certain of the modules require connection to a power supply; and all the modules require interconnection. Generally, the modules are constructed for "plugging-in" and are provided with rear-mounted terminals which are designated to be plugged-in to a mating terminal carried by the computer support frame or structure. The operational interconnections between the computing components is determined by the problem to be solved and has heretofore usually been made at the front of the module.

Until recently, computers were used only in laboratories or "computer centers." More recently increased ruggedness and reliability has allowed computers to become useful tools of industry. They are now employed at such diverse tasks as the control of chemical plants, power generating plants and others of equal magnitude and importance. The movement of the computer from the laboratory to industrial application has not been without considerable problems. Whereas laboratory computers were designed and constructed so that rapid changes in the interconnections were possible such a construction would be hazardous in industry where the changing of connections, inadvertently or deliberately, by unauthorized or untrained personnel is a possibility. Certain periodic testing and adjustment of all computers is necessary from time to time. It is therefore desirable that plant personnel be allowed access to the computer. Fixed or permanently wired computers were suggested as a solution to the "access" problem but they were generally considered unsatisfactory since provision must be made for replacement of the computing components for repair or to allow adaptation of the computer to changes in the "program" or problem.

Plug-in modules, where all connections are permanently made at the rear of the computing components, have been suggested as a possible solution to the foregoing needs. However, such units have inherent drawbacks due to the complexity involved in providing power supply or bus terminals and interconnection or termination points at the same location while maintaining ease of exchange and interchange of the computer components. In order to change the type of computing component plugged-in at a particular position, it is necessary that the plug-in terminal at that position provide the proper connections. Each such change in plug-in terminal wiring may require that as many as twenty or more wires be shifted and reconnected as by soldering. It can be seen that such a change would be laborious, expensive and time consuming. Moreover, where a change of this nature is made in the field, reliability of the various connections is below that of similar connections made and tested by the manufacturer under controlled in-plant conditions. Therefore, it is an object of this invention to obviate the aforementioned difficulties and problems by the provision of improved computer interconnection and mounting apparatus.

It is another object of this invention to provide a computer structure having exposed computing component test points and protected interconnections therebetween.

It is yet another object of this invention to improve plug-in module structures for use in computers.

It is a further object of this invention to increase the flexibility of computer structures for exchange or interchange of plug-in modules.

The above and other objects, advantages and novel features of the invention are achieved in the illustrative embodiment of the invention described in detail below. Briefly, in the illustrative embodiment of the invention there is provided a computer including a plurality of modularized computing components, and a plurality of complementary associated patching modules. The computing components and the patching modules are adapted for plug-in connection to one another and the patching modules provide for the cross-connections or interconnections between the associated computing components.

The illustrative embodiment will be best understood from the following description when taken in conjunction with accompanying drawings, forming part of this disclosure, in which drawings.

Figure 1:
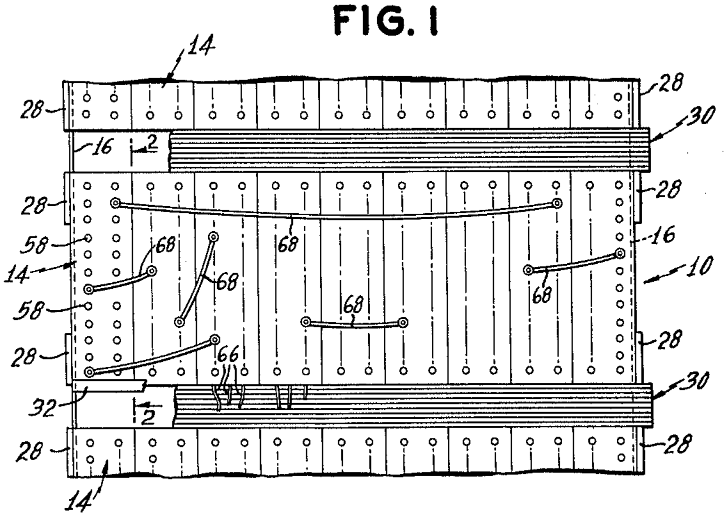
FIG. 1 is a fragmentary rear elevation of a computer structure embodying the illustratvie embodiment.

Referring to the drawings, the computer 10 comprises a plurality of computing components 12 and associated patching or interconnecting modules 14. While only one form of computing component 12 is shown it will be understood that the use of the other forms, in combination, is contemplated. With each form or type of computing component there is associated a complementary patching module 14.

For better understanding of the invention a brief description of the physical structure of the computer follows. A pair of upright opposed sidewalls 16 are spanned by a plurality of shelves 18. Each shelf determines a tier of computing components 12 and each shelf has a perpendicular wall 20 rising upwardly and secured to the sidewalls 16. At points corresponding to the basic modular width W (FIG. 5) of a computing component, the wall 20 is provided with a pair of registration apertures 22, and a connector aperture 24. The purpose of these apertures will be explained in greater detail below. At the front or operator's side of the computer restraining means, which comprises a shaped bar 26 securable to the sideplates 16, are provided for maintaining the computing components 12 in position against the wall 20.

Figures 2, 3, 4, 5:
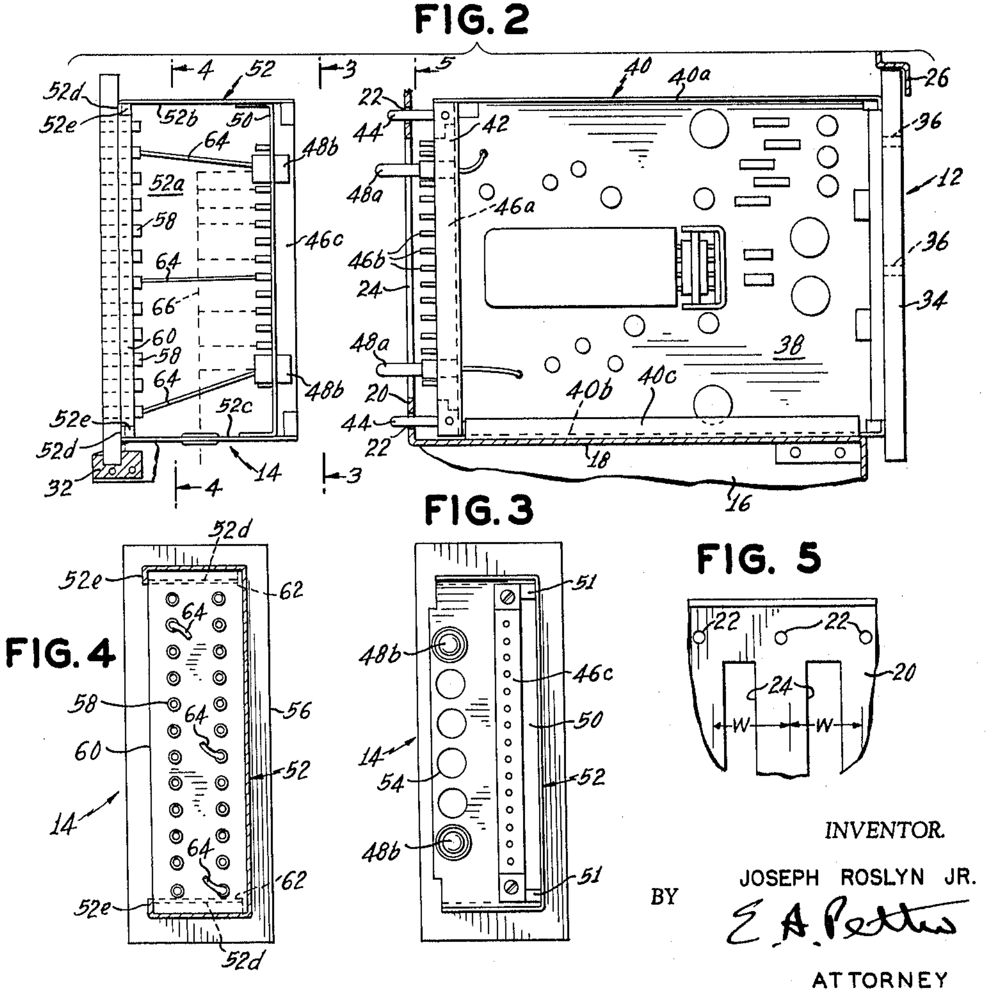
FIG. 2 is a side elevation of the computer of FIG. 1 viewed from the plane 2—2, therein showing a computing component and associated patching module with some parts omitted in the interest of clarity.
FIG. 3 is an end view of the patching module of FIG. 2 as viewed from the plane 3—3 therein.
FIG. 4 is a sectional view of the patching module of FIG. 2 as viewed from the plane 4—4 therein with some parts in section, and with other parts broken away or omitted in the interest of simplicity and clarity.
FIG. 5 is a fragmentary front elevation of the component registration wall as viewed in the direction of the arrow 5 of FIG. 2.

Extending rearwardly of the computer structure are brackets 28 (FIG. 1) secured to the sidewalls 16, four of said brackets being present at each tier of patching modules 14. These brackets serve two major purposes. They support and position the power bus assembly 30 which provides energization for the various computer components. The bus assembly supplies the various power voltages and biasing voltages on separate conductors therein, and is shown and described in detail in the copending application entitled, "Computer Bus Assembly," S.N. 287,144 filed June 11, 1963, which is assigned to the same assignee as the present invention. The brackets 28 also mount opposed patching module 14 retaining means 32 which span across each tier of modules there above and below. Only one such retaining bar 32 is shown in FIGS. 1 and 2 for purposes of clarity. Referring to FIG. 2 the computing component 12 is double the basic modular width *w* and has a front wall 34 of insulating material. A plurality of receptors 36 for plug-in test probes (not shown) are provided in the wall 34 and are connected to test points in the computer circuitry whereby various tests may be made from the front of the component 12 to ascertain the condition and settings of the component. The component circuitry and elements are mounted on an insulation board 38 by well-known methods. Insulation board 38 is carried by three-sided metal can 40 which is secured at one end to the front wall 34 and which has a shelf 42 adjacent the other end. In FIG. 2, the broad side of the can 40 is obscured by the circuit board 38 which is spaced therefrom between the upright legs 40*a* and 40*b* of the can 40. Leg 40*b* is provided with an inturned flange 40*c*.

Registration pins 44 are affixed adjacent the corners of the computing component can 40 adjacent the base of each upstanding leg 40*a*, 40*b* and extend therefrom beyond the end of the can. The clearance between the pins 44 and apertures 22 in FIG. 2 is greatly exaggerated for clarity of illustration. The purpose of these pins will be explained in greater detail below.

The male or extended contact half 46*a* of a multiple contact plug-in connector is mounted on the shelf 42 with the contacts 46*b* extending beyond the end of the can 40. The connector is adjacent the broad wall of the can 40 and is positioned so that it passes through the first of two connector apertures 24 in wall 20 associated with the double modular width *w* of the illustrative computing component 12. A pair of plug-in contacts 48*a* are also mounted on the shelf 42. Contacts 48*a* are positioned so as to be passed through the second connector aperture 24 in wall 20 (FIG. 5). The conductors connecting the electrical circuitry on board 38 to the connectors 46*a*, 48*a* and the details of the circuit are omitted in the interests of clarity, since the particular circuit and connections thereof are not pertinent to the understanding of the present disclosure. Each computing component 12 has information input and output terminals commonly called terminations. Heretofore, such terminations have been provided at the end of the plug-in module remote from the plug-in connectors. In the illustrative embodiment of the invention, the individual plug-in connectors 48*a* and one of the contacts 46*b* of the multiple contact unit 46*a* are the terminations of the computing component 12.

The plug-in patching module 14 carries complementary plug-in receptacles to mate with the plug-in contacts carried by the computing component 12. Referring to FIGS. 2 and 3, multiple contact socket 46*c* is mounted on a shelf 50 secured to rear or inner end of the patching module can 52 and preferably has an extending portion dimensionally equivalent, within manufacturing tolerances, to that of aperture 24. Plug-in sockets 48*b* are mounted in two of a series of apertures 54 in the shelf in registration with contacts 48*a*. Plural apertures 54 are provided so that the patching module structural assembly may be used with other circuits therein, when desired, without major modification. Apertures 51 are provided in the shelf 50 for reception of registration pins 44 and permit unrestricted relative movement of a computing component and patching module during engagement of the separable contacts.

The patching module 14 has a front wall 56 of insulation, similar to computing component wall 34, which is provided with a plurality of arrayed plug-in receptors 58 whose purpose will be explained below. Receptors 58 have one end flush with the substantially plane outer face of wall 56 and extend inwardly beyond an integral shoulder 60 of the wall. The shoulder 60 is narrower and shorter than the wall 56 and corresponds closely to the inner dimensions of the patching module can 52. The three-sided can 52 has a broad face 52*a* and two perpendicular narrower faces 52*b* and 52*c*. Can faces 52*b* and 52*c* are each provided with a flange 52*d* which is parallel to the width of the respective connected face. Each face 52*b*, 52*c* is further provided with a tab 52*e* which extends beyond the long edge of the face adjacent the flange 52*d* thereof. Shoulder 60 of wall 56 has two transverse recesses 62 formed therein at junction of the narrow dimension of the shoulder and the wall. The wall is assembled to the preformed can by sliding the flanges 52*d* into the recesses 62 until shoulder 60 abuts the broad face 52*a* of the can. Tabs 52*e* are then bent parallel to can face 52*a* and lock the wall 56 securely to the can. This construction may also be utilized in securing the wall 34 of the computing component 12 to its can 40.

Selected ones of the receptors 58 are connected by wires 64 to the contacts 48*b*, 48*b* and 46*c* previously designated termination points of the computing component 12. Other wires 66, shown in dotted lines in FIG. 2 are connected to respective sockets of the plug-in contact 46*c* and are then bundled together and passed through an insulating grommet in the module wall 52*c*. A similar grommet, not shown, may be also provided in the wall 52*b* to provide an alternate passageway for some or all of the wires 66 externally of the module 14. External of the patching module 14 the wires 66 are connected to selected bus bars of a power bus assembly 30, as by plug-in connectors (not shown), to provide proper energization of the computing component 12 when plugged into the complementary patching module 14. The power supply (not shown) for the bus assembly 30 is of the multiple-voltage type well-known in the art.

Referring to FIG. 1 the termination point receptors 58 of the various patching modules 14 are interchangeably interconnected as suggested by conductors 68. These interconnections, which are based on the computing problem to be solved, are made at the rear face of the computer as opposed to the front face test points 36 previously described. When the computer 10 is positioned in an enclosure (not shown) the interconnections 68 are at the "rear" of the enclosure and are not as readily accessible as the test points 36 which are then at the "front" of the enclosure When a computer 10 is initially assembled, the patching modules 14 are first positioned relative to a corresponding aperture 22 in the wall 20 by disposing the extending portion of corresponding contact socket 46*c* therethrough. The enlarged portion of socket 46*c* may engage the rear side of the wall 20 in the vicinity corresponding aperture 22 when patching module 14 is fully inserted to limit inward movement. The patching modules 14 are then retained securely in position by the bars 32 which are, in turn, secured to the brackets 28. The respective complementary computing components 12 are next positioned on the shelf 18 with the registry pins 44 passing through the apertures 22 in the wall 20 and into the apertures 51. Thereafter, the computing component 12 is firmly positioned relative to its patching module 14 by the engagement of the plug-in contacts with their respective complementary units via the apertures 24 in the wall 20. The respective power supplying wires 66 of the patching modules 14 are then connected by appropriate connectors to the power bus 30 in accordance with the requirements of the mating computing components 12. Subsequently, the interconnections 68 are made to produce an operative computer. It should be understood that the number and variety of interconnections 68 illustrated has been greatly reduced and simplified for purposes of clarity.

It can be seen from the foregoing that any module based on multiples of a basic thickness *w* may be inserted into and received by the computer structure at any point in the structure and the structure is therefore conducive to simplification of the computer layout and design. If, for any reason, a computing component 12 of a particular type must be replaced by one of another type at the same location, it may easily be done in the above described construction. Assuming the two modular components 12 are of the same thickness then the interchange is made as follows: Retainer bar 26 is removed and the computing component 12 is withdrawn. The interconnections 68 to the associated complementary patching module 14 and the connections from the module to the bus 30 are disconnected and the retainer bars 32 are removed. The patching module 14 is then removed from the computer. The new patching module is inserted and the retaining bars 32 are replaced. The new computing component 12 is plugged-in and is engaged by the plug-in contacts with the aid of the registry pins 44. The retainer bar 26 is then secured. The power bus wires 66 are connected to achieve proper circuit energization and the module terminations at receptors 58 are connected into the existing computer circuit by the proper interconnections 68. As can be readily seen from the foregoing, changes in the circuitry of the computer 10 are readily made without requiring rewiring of the computer structure. The complementary patching module 14 and associated computing component 12 may be fully tested in their assembled, "plugged-in" condition in the factory with assurance that they will be properly connected to one another in the field.

When a computing component 12 alone needs replacement then the retainer bar 26 is removed and the component unplugged from the patching module 14. A new computing module is then inserted, and secured; the patching module 14 is retained in position by the bars 32 and its lateral movement is prevented by the adjacent patching modules.

The illustrative embodiment of the invention described above provides a unique solution to the several complex problems in computer design and construction set forth in detail above. Greater flexibility and enhanced safety are provided simultaneously. It will be understood by those skilled in the art that various changes and modifications may be made herein without departing from the spirit or scope of the invention.

What is claimed is:

1. In a computer a combination which comprises
a plurality of patching modules,
a plurality of pluggable elements each associated with a different patching module,
each of said pluggable elements including a computing element comprising an electronic circuit having terminal portions,
a connector element for each said pluggable element being connected to the terminal portions of its respective computing element,
a mating connector element for each of said patching modules adapted to removably engage said connector element only of its one associated pluggable element,
means connecting selected electrical connections of each said mating connector elements to an electrical power structure,
each of said pluggable elements having a first closure member at an end thereof remote from its associated patching module and having disposed in said first closure member a plurality of test terminals electrically connected to its associated computing element, and
each of said patching modules having a second closure member secured to an end thereof remote from its associated pluggable element and having disposed in said second closure member a plurality of receptor means electrically connected to said mating connector element for selective patching interconnections with receptor means of other patching modules whereby each of said pluggable elements may be removed from said computer without disturbing said patching interconnections and said power connections, each of said patching modules containing only electrical connections and not containing electronic circuit elements,
said first closure members of said pluggable elements forming one side of said computer and said second closure members of said patching modules forming an opposite side of said computer.

2. In a computer a combination which comprises
a plurality of patching modules,
a plurality of pluggable elements each associated with a different patching module,
each of said pluggable elements including a computing circuit having terminal portions,
plug-in connector means for each of said pluggable elements having connections to the terminal portions of its respective computing circuit,
mating plug-in connector means for each of said patching modules adapted to removably engage said plug-in connector means only of its one associated pluggable element,
means connecting selected electrical connections of each of said mating plug-in connector means to a computer power bus structure,
each of said pluggable elements having a first insulated closure member at an end thereof remote from its associated plug-in connector means and having disposed in said first closure member a plurality of test terminals, and
each of said patching modules having a second insulated closure member secured to an end thereof remote from its associated mating plug-in connector means and having disposed in said second closure member a plurality of receptor means electronically connected to other selected electrical connections of said mating plug-in connector means for selective patchin interconnection with receptor means of other patching modules whereby said pluggable elements may be selectively removed from said computer without change in said patching interconnections and said power bus connections, each of said patching modules containing only electrical connections and not containing electronic circuit elements,
said first closure members forming one face of said computer and said second closure members forming an opposite face of said computer.

3. A computer structure comprising
a plurality of patching modules each including an enclosure can,
a plurality of pluggable elements each associated with a different patching module,
each of said pluggable elements including a computing element comprising an electronic circuit having terminal portions,
a plug-in connector for each of said pluggable elements having connections to the terminal portions of its respective computing circuit,
a mating plug-in connector for each of said patching modules secured to said can and adapted to removably engage said plug-in connector only of its one associated pluggable element,
means connecting selected electrical connections of each of said mating plug-in connectors to a computer power bus structure,
each of said pluggable elements having a first insulated member secured to and closing an end thereof remote from its associated plug-in connector and having disposed in said first insulated member a plurality of test terminals electrically connected to its associated computing element, and each of said patching modules having a second insulated member secured to and closing an end of said can remote from its associated mating plug-in connector and having mounted in said second insulated member and passing therethrough from the interior to the exterior of said can a plurality of receptor means electronically connected to other selected electrical connections of said mating connector element for selective patching with receptor means of other patching modules, each of said patching modules containing only electrical connections and not containing electronic circuit elements, whereby said pluggable elements may be selectively removed from said computer without change in said patching and said power bus connections, said first closure members forming one face of said computer and said second closure members forming an opposite face of said computer.

4. In a computer a combination which comprises a plurality of patching modules, a plurality of pluggable elements each associated with a different patching module and each having registry means and plug-in-means, each of said pluggable elements including a computing element comprising an electronic circuit having terminal portions, means connecting said plug-in means to the terminal portions of its respective computing element, mating registry means and mating plug-in means for each of said patching modules adapted to removably engage said registry means and plug-in means respectively of its associated pluggable element, means connecting selected electrical connections of each said mating plug-in means to an electrical power structure, a support structure including side walls, a shelf spanning said side walls for supporting said pluggable elements, a transverse wall extending between said side walls adjacent said shelf, each of said pluggable elements having a first closure member secured to an end thereof remote from its associated patching module and having disposed in said first closure member a plurality of test terminals, each of said patching modules having a second closure member secured to an end thereof remote from its associated pluggable element and having disposed in said second closure members a plurality of receptor means electrically connected to said mating plug-in means, each of said patching modules containing only electrical connections and not containing electronic circuit elements, said transverse wall having apertures therein for admitting and guiding said registry means and said plug-in means whereby said pluggable elements and said patching modules are positioned in said support structure for mutual engagement with said transverse wall therebetween, said first closure members of said pluggable elements forming one side of said computer and said second closure members of said patching modules forming an opposite side of said computer.

5. A computer according to claim 2 wherein first means are provided for retaining said pluggable elements in said structure and second means are provided for retaining said patching modules in said structure.

References Cited by the Examiner

UNITED STATES PATENTS

| | | | |
|---|---|---|---|
| 2,788,470 | 4/1957 | Giel et al. | 317—101 |
| 2,910,628 | 10/1959 | Keener | 317—101 |

OTHER REFERENCES

Electro-Technology, April 1961, page 166.

KATHLEEN H. CLAFFY, *Primary Examiner.*

JOHN F. BURNS, *Examiner.*

JOE G. COBB, WILLIAM C. GARVERT, *Assistant Examiners.*